(12) United States Patent
Liu et al.

(10) Patent No.: US 9,780,874 B2
(45) Date of Patent: Oct. 3, 2017

(54) LIGHT SIGNAL-BASED INFORMATION PROCESSING METHOD AND DEVICE

(71) Applicant: KUANG-CHI INNOVATIVE TECHNOLOGY LTD., Shenzhen (CN)

(72) Inventors: Ruopeng Liu, Shenzhen (CN); Lin Luan, Shenzhen (CN); Min Liu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 14/616,755

(22) Filed: Feb. 9, 2015

(65) Prior Publication Data

US 2015/0188633 A1  Jul. 2, 2015

Related U.S. Application Data

(63) Continuation of application No. PCT/CN2013/082728, filed on Aug. 30, 2013.

(30) Foreign Application Priority Data

Aug. 31, 2012 (CN) .......................... 2012 1 0316956
Aug. 31, 2012 (CN) .......................... 2012 1 0317150
Nov. 16, 2012 (CN) .......................... 2012 1 0462192

(51) Int. Cl.
*H04B 10/116* (2013.01)
*H04L 9/32* (2006.01)
*G07C 9/00* (2006.01)

(52) U.S. Cl.
CPC ....... *H04B 10/116* (2013.01); *G07C 9/00182* (2013.01); *H04L 9/3226* (2013.01);
(Continued)

(58) Field of Classification Search
CPC ..... H04B 10/11; H04B 10/114–10/116; H04L 9/32; H04L 9/3226–9/3247
(Continued)

(56) References Cited

U.S. PATENT DOCUMENTS 4,788,542 A * 11/1988 Tanabe ............... G07C 9/00182
307/10.2
6,104,810 A * 8/2000 DeBellis ................. G06F 7/582
380/43
(Continued)

FOREIGN PATENT DOCUMENTS

CN         2358214 Y      1/2000
CN         1405426 A      3/2003
(Continued)

OTHER PUBLICATIONS

Bec, Thierry, Supplementary European Search Report of EP application No. 13832287, dated Mar. 31, 2016.

*Primary Examiner* — Li Liu
(74) *Attorney, Agent, or Firm* — Perkins Coie LLP

(57) ABSTRACT

The present invention discloses a light signal-based information processing method and device. The method includes: receiving trigger information; extracting corresponding information according to the trigger information; sending the extracted information in a form of a visible light signal, or receiving a visible light signal; obtaining modification of user information and user information according to the visible light signal; and modifying stored user list information according to the modification of user information and the user information, so that an authorization information list of a light signal receiving device can be modified conveniently no matter whether the light signal receiving device is fixed in a specific system.

20 Claims, 8 Drawing Sheets

(52) U.S. Cl.
CPC .............. *G07C 9/00817* (2013.01); *G07C 2009/00785* (2013.01)

(58) Field of Classification Search
USPC .................................. 398/118, 126–131, 172
See application file for complete search history.

(56) References Cited

U.S. PATENT DOCUMENTS

| | | | | |
|---|---|---|---|---|
| 7,734,181 | B2* | 6/2010 | Bahar | H04W 76/02 370/310 |
| 7,826,745 | B2* | 11/2010 | DeCusatis | H04J 14/08 398/17 |
| 8,093,988 | B2* | 1/2012 | Takene | G07C 9/00111 340/5.64 |
| 8,620,154 | B2* | 12/2013 | Li | H04W 76/028 398/1 |
| 8,866,584 | B2* | 10/2014 | Yamaguchi | G06F 21/629 340/1.1 |
| 2004/0124965 | A1 | 7/2004 | Chiou | |
| 2005/0276610 | A1* | 12/2005 | Hirayama | H04B 10/1125 398/140 |
| 2008/0055041 | A1* | 3/2008 | Takene | G07C 9/00111 340/5.7 |
| 2008/0247345 | A1* | 10/2008 | Bahar | H04W 76/02 370/310 |
| 2008/0247759 | A1* | 10/2008 | Bahar | H04B 10/1125 398/118 |
| 2011/0314153 | A1* | 12/2011 | Bathiche | H04L 63/08 709/225 |
| 2012/0092350 | A1* | 4/2012 | Ganapathi | G02B 26/0833 345/501 |

FOREIGN PATENT DOCUMENTS

| | | |
|---|---|---|
| CN | 1563653 A | 1/2005 |
| CN | 1609395 A | 4/2005 |
| CN | 101087361 A | 12/2007 |
| CN | 101599187 A | 12/2009 |
| CN | 101630205 A | 1/2010 |
| CN | 102289634 A | 12/2011 |
| CN | 102542640 A | 7/2012 |
| CN | 202404609 U | 8/2012 |
| CN | 102983977 A | 3/2013 |
| JP | 9-144400 A | 6/1997 |
| WO | 2012004734 A1 | 1/2012 |

* cited by examiner

LIGHT SIGNAL-BASED INFORMATION PROCESSING METHOD AND DEVICE

CROSS REFERENCE TO RELATED APPLICATIONS

This application is a continuation of PCT/CN2013/082728 filed 2013 Aug. 30, which claims priority to CN 201210316956.3 filed 2012 Aug. 31, CN 201210317150.6 filed 2012 Aug. 31, and CN 201210462192.9 filed 2012 Nov. 16, all of which are incorporated herein by reference.

TECHNICAL FIELD

The disclosure relates to the field of light signal technologies, and in particular, to a light signal-based information processing method and device.

BACKGROUND

Optical communication includes non-visible light communication and visible light communication. An example of common non-visible light communication is infrared communication. Infrared communication uses an infrared ray as a medium for transmitting information. A transmit end modulates a baseband binary signal into a series of burst signals, and transmits an infrared signal by using an infrared emitter. A receive end converts a received optical pulse into an electric signal, performs processing such as amplification and filtering, and then sends it to a demodulation circuit for demodulation, whereupon a binary digital signal is recovered and output. Common visible light communication is a short-distance high-speed wireless optical communication technology that emerges from an LED technology. A basic principle of visible light communication is that communication is performed by blinking an LED light source at a high frequency based on the characteristics that a switching speed of an LED is faster than that of a fluorescent lamp and an incandescent lamp. Presence of light is indicated by binary 1, and absence of light is indicated by binary 0. Information may be obtained after a high-speed light signal undergoes photovoltaic conversion.

In the prior art, a signal receiving device is authorized by connecting a host computer to a USB interface, and host computer software reads and manages an authorized ID list inside the signal receiving device through the USB interface. However, because the signal receiving device is generally installed in a fixed location of a system, it is very inconvenient to connect the signal receiving device by using a USB. A possible consequence is that a user can be authorized only before installation.

Access control is a control network system formed of a controller that uses a CPU processor as a core, an information collector, an electric lock, and the like. System information is read, and the read information is authenticated according to a prestored authorized ID list, so as to implement automatic control on opening and closing of a door lock. According to the information reading manner, access control may be categorized into a plug-in card type, an induction type, an image recognition type, an eye iris recognition type, and the like. Independent access control is non-networked, each door lock is independent, and information of each door lock is generally read by means of a plug-in card or induction. Its advantage is cost-effective. A networked access control system is formed of a controller, a card reader, an electric lock, a door opening button, and the like, and is an underlying control layer and an execution layer of system integration.

In the prior art, an intelligent lock is authorized by connecting a host computer to a USB interface on the lock. Host computer software reads and manages an authorized ID list inside an optical intelligent lock through the USB interface. However, because the lock is generally fixed on a door, it is very inconvenient to connect the lock to the host computer by using a USB. A possible consequence is that a user can be authorized only before installation, and cannot be authorized after installation because the lock is fixed on the door.

Access control is a control network system formed of a controller that uses a CPU processor as a core, an information collector, an electric lock, and the like. System information is read, and the read information is authenticated according to a prestored authorized ID list, so as to implement automatic control on opening and closing of a door lock. According to the information reading manner, access control may be categorized into a plug-in card type, an induction type, an image recognition type, an eye iris recognition type, and the like. Independent access control is non-networked, each door lock is independent, and information of each door lock is generally read by means of a plug-in card or induction. Its advantage is cost-effective. A networked access control system is formed of a controller, a card reader, an electric lock, a door opening button, and the like, and is an underlying control layer and an execution layer of system integration.

In the prior art, an intelligent lock is authorized by connecting a host computer to a USB interface on the lock. Host computer software reads and manages an authorized ID list inside an optical intelligent lock through the USB interface. However, because the lock is generally fixed on a door, it is very inconvenient to connect the lock to the host computer by using a USB. A possible consequence is that a user can be authorized only before installation, and cannot be authorized after installation because the lock is fixed on the door.

SUMMARY

A technical problem to be resolved by implementation manners of the present invention is to provide a light signal-based information processing method and device, so as to solve a problem that a light signal receiving device fixed on a door cannot be authorized in the prior art.

Optionally, the light signal-based information device is a optical key for modifying authorization information of a light signal receiving device, and authorization information of the light signal receiving device can be modified no matter whether the light signal receiving device is installed in a specific fixed location of a system, thereby improving user experience.

To resolve the foregoing technical problem, an embodiment of the present invention provides a light signal-based information processing method, where the method includes:

receiving trigger information, extracting corresponding information according to the trigger information, and sending the extracted information in a form of a visible light signal; or, receiving a visible light signal, obtaining modification of user information and user information according to the visible light signal, and modifying stored user list information according to the modification of user information and the user information.

Optionally, the light signal-based information processing method is a light signal-based authorization method, where the method includes:

receiving the trigger information that represents deletion or writing of authorization information; obtaining corresponding information locally according to the trigger information; and controlling a light emitting unit to send the information in a form of a light signal.

the obtaining corresponding information according to the trigger information includes:

obtaining, according to the trigger information, an instruction of writing authorization information or an instruction of deleting authorization information.

Optionally, the receiving the trigger information that represents deletion or writing of authorization information specifically includes:

receiving, by using a press-key, the trigger information that represents deletion or writing of authorization information.

Optionally, the receiving, by using a press-key, the trigger information that represents deletion or writing of authorization information, specifically includes:

receiving, according to different numbers of times of triggering a same press-key continually, the trigger information that represents deletion or writing of the authorization information.

Optionally, the receiving, by using a press-key, the trigger information that represents deletion or writing of authorization information, specifically includes:

receiving, by using different press-keys, the trigger information that represents deletion or writing of the authorization information.

Optionally, the receiving the trigger information that represents deletion or writing of authorization information specifically includes:

receiving the trigger information by using a selection menu of a touchscreen.

Optionally, before the receiving the trigger information by using a selection menu of a touchscreen, the method further includes:

receiving unlock information such as slide-to-unlock information and displaying the selection menu.

Optionally, before the method, the following is further included:

performing authentication on the authorization information.

Optionally, the performing authentication on authorization information specifically includes:

collecting biometric information of a user, and if the biometric information matches a prestored verification condition, determining that the authorization information is legal.

Optionally, the performing authentication on authorization information specifically includes:

receiving, by using a keyboard, ID information input by a user, and if the ID information matches prestored information, determining that the authorization information is legal.

Optionally, the performing authentication on authorization information specifically includes:

receiving, by using a keyboard, ID information and/or password information input by a user, and if the ID information and/or password information matches prestored information, determining that the authorization information is legal.

Optionally, the performing authentication on authorization information specifically includes:

receiving, by using a touchscreen, ID information input by a user, and if the ID information matches prestored information, determining that the authorization information is legal.

Optionally, the performing authentication on authorization information specifically includes:

receiving, by using a touchscreen, ID information and/or password information input by a user, and if the ID information and/or password information matches prestored information, determining that the authorization information is legal.

Optionally, after the obtaining corresponding information according to the trigger information, the method further includes:

encrypting the information.

Optionally, the encrypting the information specifically includes:

using a changing pseudocode sequence and the variation authorization information to perform a logical operation and/or an arithmetic operation.

Optionally, the changing pseudocode sequence is a pseudocode sequence that changes continuously with local time; or a pseudocode sequence that changes with a preset unit time.

Optionally, the changing pseudocode sequence is a pseudocode sequence that changes continually with the preset number of signal transmission times.

Optionally, the changing pseudocode sequence is a pseudocode sequence in which a signal frequency changes with crystal oscillator information; or a pseudocode sequence in which a signal frequency changes with local clock information.

Optionally, the encrypting the information specifically includes:

using an MD5 encryption algorithm, an RSA encryption algorithm, a DES encryption method, or an AES encryption algorithm to encrypt the information.

Optionally, before the controlling a light emitting unit to send the information in a form of a light signal, the method further includes:

encoding the information.

Optionally, the light signal-based information processing method is a method for modifying information in a door lock user list, where the method includes:

receiving a visible light signal sent by a first optical key, converting the visible light signal into a first digital signal, and obtaining the modification of user information; and receiving a visible light signal sent by a second optical key, converting the visible light signal into a second digital signal, and obtaining the user information; and modifying stored user list information according to the modification of user information and the user information.

The modification of user information is writing of user information; and correspondingly, the modifying stored user list information according to the modification of user information and the user information specifically includes:

writing the user information into the stored user list information according to the writing of user information.

The modification of user information is deletion of user information; and correspondingly, the modifying stored user list information according to the modification of user information and the user information specifically includes:

deleting the user information from the user list information according to the deletion of user information.

Before the receiving a visible light signal sent by a second optical key, the method further includes:

sending response information.

To resolve the foregoing technical problem, an embodiment of the present invention provides a light signal-based information processing device, where the device includes:

a control unit, configured to receive trigger information, extract corresponding information according to the trigger information, and send the extracted information in a form of a visible light signal; or, receive a visible light signal, obtain modification of user information and user information according to the visible light signal, and modify stored user list information according to the modification of user information and the user information.

Optionally, the light signal-based information processing device is a light signal-based authorization device, which includes a storage unit and a light emitting unit, and further includes a control unit configured to receive trigger information that represents deletion or writing of authorization information, obtain corresponding information from the storage unit, and control the light emitting unit to send the information in a form of a light signal.

Optionally, the control unit further includes a modulator.

Optionally, the device further includes a driver connected between the light emitting unit and the control unit.

Optionally, the device further includes a standby power supply connected to the control unit.

Optionally, the device further includes an interface connected to the control unit.

The interface is a charging interface and/or a data interface.

Optionally, the device further includes at least one press-key connected to the controller.

Optionally, the device further includes a touchscreen connected to the control unit.

Optionally, the device further includes a fingerprint processor connected to the touchscreen and configured to receive and authenticate fingerprint information collected by the touchscreen.

Optionally, the device further includes a slide processor configured to receive and authenticate unlock information received by the touchscreen.

Optionally, the device further includes a keyboard connected to the control unit and configured to input user ID information.

Optionally, the device further includes a digital processor connected to the keyboard and configured to receive and authenticate user ID information.

Optionally, the control unit further includes an encrypting unit, configured to encrypt information obtained from the storage unit.

Optionally, the encrypting unit is a logical operator and/or an arithmetic operator.

The encrypting unit is an MD5 encryption operator, an RSA encryption operator, a DES encryption operator, or an AES encryption operator.

The device is integrated in a mobile electronic device such as a mobile phone, an MP3, an MP4, and a PSP, or is an independent device.

In the foregoing technical solution, according to received trigger information, a control unit determines whether to write or delete authorization information, and then obtains corresponding information from a storage unit connected to the control unit, and sends the information in a form of a visible light signal, thereby implementing deletion or modification of the authorization information of a light signal receiving device. When receiving deletion or modification of authorization information, the light signal receiving device makes a response if legality is determined; when receiving deletion or writing of authorization information, the light signal receiving device deletes the authorization information from an authorization information list or writes the authorization information into an authorization information list.

A technical problem to be resolved by the implementation manners of the present invention is to provide a method for modifying information in a door lock user list and a light-controlled intelligent lock to modify information in a door lock user list no matter whether a door lock is fixed on a door, so as to improve user experience.

Optionally, the light signal-based information processing device is a light-controlled intelligent lock and includes a photoelectric sensor, configured to receive a visible light signal and convert the received visible light signal into a digital signal; and a central processing unit, connected to the photoelectric sensor and configured to: when receiving a first digital signal representing modification of user information and a second digital signal representing user information from the photoelectric sensor consecutively, control a memory connected to the central processing unit to modify user list information according to the user information.

The light-controlled intelligent lock further includes an indicator, connected to the central processing unit and configured to send an indication signal when receiving an indication instruction sent by the central processing unit.

The light-controlled intelligent lock further includes a voice unit, connected to the central processing unit and configured to emit a prompt tone when receiving a voice prompt instruction sent by the central processing unit.

In the foregoing technical solution, the light-controlled intelligent lock modifies stored user information list according to modification of user information and user information when consecutively receiving a visible light signal that is sent by a first optical key and represents the modification of user information, and a visible light signal that is sent by a second optical key and represents the user information. Therefore, the user information list can be modified in a contactless manner, which avoids that user list information cannot be modified after a door lock is installed on a door.

A technical problem to be resolved by implementation manners of the present invention is to provide a fingerprint optical key for modifying information in a door lock user list to modify information in a door lock user list no matter whether a door lock is fixed on a door, so as to improve user experience.

Optionally, the light signal-based information processing device is a fingerprint optical key for modifying user list information, where the fingerprint optical key includes a fingerprint module configured to collect user fingerprint information and at least one press-key; a central processing unit connected to the fingerprint module and the press-key authenticates fingerprint information when receiving the fingerprint information sent by the fingerprint module; if the authentication succeeds, when receiving trigger information from the press-key, determines whether the trigger information represents writing or deletion of user list information; according to a result of the determining, extracts corresponding information from a storage unit connected to the central processing unit; and uses a light emitting unit connected to the central processing unit to send the extracted information in a form of a visible light signal.

The central processing unit further includes an encryption unit configured to encrypt the extracted information by using an encryption algorithm.

The central processing unit further includes a modulator configured to modulate the binary data.

The fingerprint optical key further includes a driver connected between the light emitting unit and the central processing unit.

The fingerprint optical key further includes a power supply connected to the central processing unit.

The fingerprint optical key further includes a standby power supply connected to the central processing unit.

The standby power supply is a button battery.

The fingerprint optical key further includes a USB interface connected to the central processing unit.

The light emitting unit is an LED lamp.

In the foregoing solution, a central processing unit performs a further action only if determining that a user of a fingerprint optical key is a legal user, which prevents an illegal user from using the fingerprint optical key to modify information in a door lock user list; according to received trigger information, the central processing unit sends a visible light signal to a door lock, where the visible light signal represents deletion or writing of user information, and then the door lock implements deletion or writing of the user information, which thus avoids a scenario in which authorization cannot be performed because a door lock is fixed on a door after being installed.

BRIEF DESCRIPTION OF DRAWINGS

To describe the technical solutions in the implementation manners of the present invention or in the prior art more clearly, the following briefly describes the accompanying drawings required for describing the implementation manners or the prior art. Apparently, the accompanying drawings in the following description show merely some implementation manners of the present invention, and a person of ordinary skill in the art may still derive other drawings from these accompanying drawings without creative efforts.

EMBODIMENTS

The following clearly and completely describes the technical solutions in the implementation manners of the present invention with reference to the accompanying drawings in the implementation manners of the present invention. Apparently, the described implementation manners are only a part rather than all of the implementation manners of the present invention. All other implementation manners obtained by a person of ordinary skill in the art based on the implementation manners of the present invention without creative efforts shall fall within the protection scope of the present invention.

In the implementation manners of the present invention, a light signal transmitting device (a super optical key) that modifies authorization information of a light signal receiving device sends a light signal of deleting or writing authorization information to the light signal receiving device. After receiving the visible light signal, the light signal receiving device authenticates the received visible light signal, and makes a response if the authentication succeeds; and the light signal receiving device receives information sent by a light signal transmitting device (an ordinary optical key) corresponding to the authorization information, and then deletes the authorization information from authorization information, or writes the authorization information into authorization information. In this way, the authorization information of the light signal receiving device is modified by using the super optical key, and the authorization information of the light signal receiving device is managed.

Figure 1:
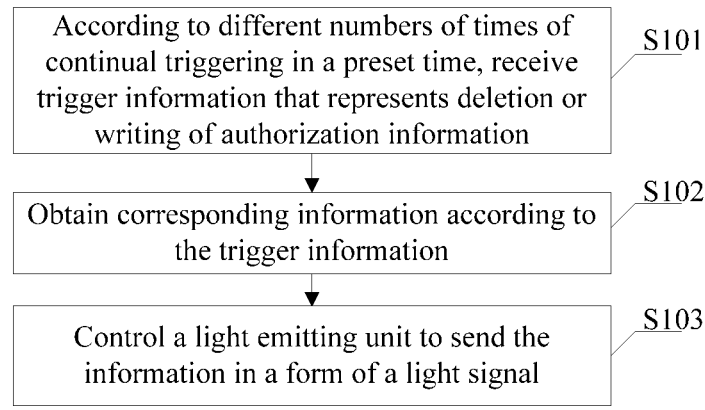
FIG. 1 is a flowchart of a light signal-based authorization method according to Embodiment 1 of the present invention.

Referring to FIG. 1, FIG. 1 is a flowchart of a light signal-based authorization method according to Embodiment 1 of the present invention. The method includes the following steps:

S101. According to different numbers of times of continual triggering in a preset time, receive trigger information that represents deletion or writing of authorization information.

For example, triggering for more than 2 times in 2 seconds represents deletion of the authorization information, and triggering for one time represents writing of the authorization information.

S102. Obtain corresponding information according to the trigger information. That is, if the trigger information represents deletion of authorization information, an instruction of obtaining deletion of authorization information is obtained; or, if the trigger information represents writing of authorization information, an instruction of obtaining writing of authorization information is obtained.

S103. Control a light emitting unit to send the information in a form of a light signal. Specifically, the light signal may be a visible light signal, or may be an infrared signal, a far infrared signal, or an ultraviolet signal.

In this embodiment, authorization information of a light signal receiving device can be modified conveniently, where the authorization information of the light signal receiving device may be a white list, a blacklist, or may be authorization information, which is sorted according to a priority, of a light signal receiving device.

Figure 2:
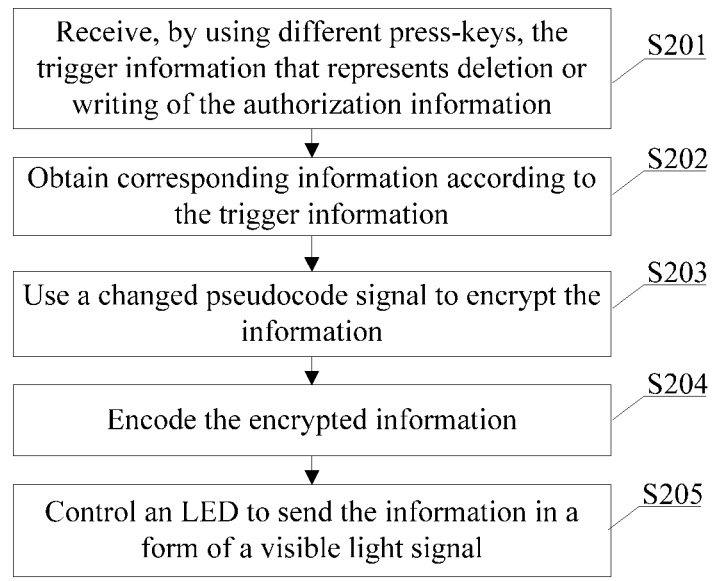
FIG. 2 is a flowchart of a light signal-based authorization method according to Embodiment 2 of the present invention.

Referring to FIG. 2, FIG. 2 is a flowchart of a light signal-based authorization method according to Embodiment 2 of the present invention. The method includes the following steps:

S201. By using different press-keys, receive trigger information that represents deletion or writing of authorization information.

For example, the trigger information sent by a press-key 1 represents deletion of the authorization information, and the trigger information sent by a press-key 2 represents writing of the authorization information.

S202. Obtain corresponding information according to the trigger information.

S203. Use a changing pseudocode signal to encrypt the information.

Specifically, for the purpose of encryption, the changing pseudocode sequence and authentication information with an error correction code may be used to perform a logical encryption operation, and/or the changing pseudocode sequence and the authentication information with an error correction code may be used to perform an arithmetic encryption operation.

Logical encryption operations include logical operation manners, such as encryption operation, XNOR encryption operation, or NAND encryption operation; and arithmetic encryption operations include arithmetic operation manners, such as addition encryption operation, subtraction encryption operation, multiplication encryption operation, or a division encryption operation.

The changing pseudocode sequence may be a pseudocode sequence that changes continuously with local time, or a pseudocode sequence that changes with a preset unit time, or a pseudocode sequence that changes with the preset number of signal transmission times, or a pseudocode sequence in which a signal frequency changes with a preset condition, for example, in which a frequency of a pseudocode sequence changes with crystal oscillator information, or in which a frequency of a pseudocode sequence changes with local clock information.

S204. Encode the encrypted information.

S205. Control an LED to send the information in a form of a visible light signal.

In this embodiment, information is encrypted by using a changing pseudocode signal, which improves security of signal transmission.

Figure 3:
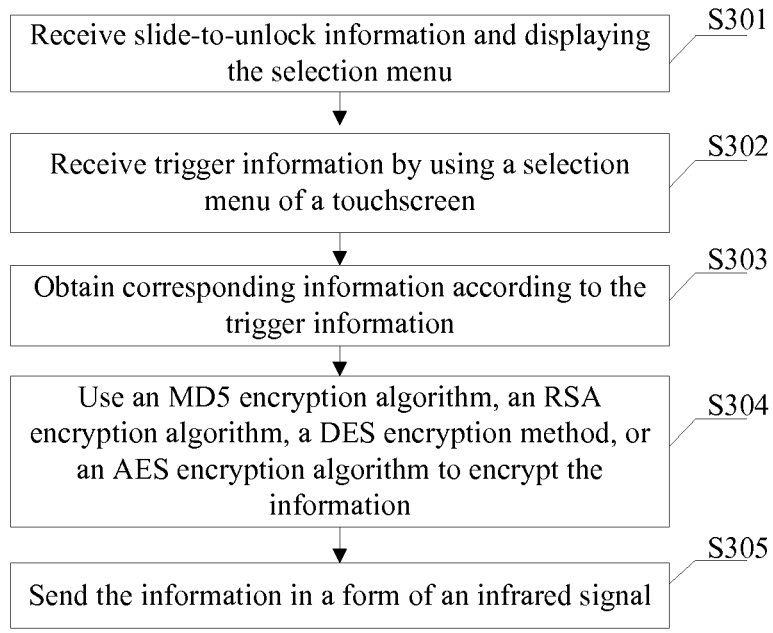
FIG. 3 is a flowchart of a light signal-based authorization method according to Embodiment 3 of the present invention.

Referring to FIG. 3, FIG. 3 is a flowchart of a light signal-based authorization method according to Embodiment 3 of the present invention. The method includes the following steps:

S301. Receive unlock information such as slide-to-unlock information and displaying a selection menu.

S302. Receive trigger information by using a selection menu of a touchscreen.

S303. Obtain corresponding information according to the trigger information.

S304. Use an MD5 encryption algorithm, an RSA encryption algorithm, a DES encryption method, or an AES encryption algorithm to encrypt the information.

S305. Send the information in a form of an infrared signal.

This embodiment uses a slide-to-unlock manner, which can improve user experience.

Figure 4:
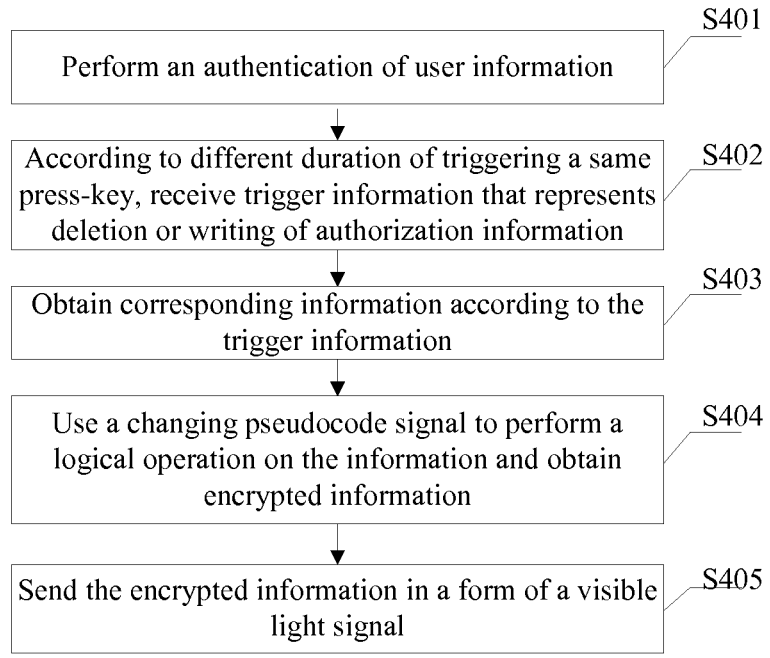
FIG. 4 is a flowchart of a light signal-based authorization method according to Embodiment 4 of the present invention.

Referring to FIG. 4, FIG. 4 is a flowchart of a light signal-based authorization method according to Embodiment 4 of the present invention. The method includes the following steps:

S401. Perform authentication on authorization information.

Specifically, biometric information of a user may be collected, and if the biometric information matches a prestored verification condition, it is determined that the authorization information is legal; or, ID information input by the user is received by using a keyboard, and if the ID information matches prestored information, it is determined that the authorization information is legal; or, ID information input by the user is received by using a touchscreen, and if the ID information matches the prestored information, it is determined that the authorization information is legal.

The performing authentication on authorization information may be: receiving, by using a keyboard, ID information and/or password information input by a user, and if the ID information and/or password information matches prestored information, determining that the authorization information is legal; or, receiving, by using a touchscreen, ID information and/or password information input by a user, and if the ID information and/or password information matches prestored information, determining that the authorization information is legal.

S402. According to different duration of triggering a same press-key, receive trigger information that represents deletion or writing of the authorization information.

For example, if triggering duration at a time is greater than or equal to 3 seconds, it represents deletion of the authorization information, and if the triggering duration is less than 3 seconds, it represents writing of the authorization information.

S403. Obtain corresponding information according to the trigger information.

S404. Use a changing pseudocode signal to perform a logical operation on the information and obtain encrypted information.

S405. Send the encrypted information in a form of a visible light signal.

In this embodiment, authorization information is authenticated before trigger information is received, and illegal users are unable to send trigger information, which further improves security.

Figure 5:
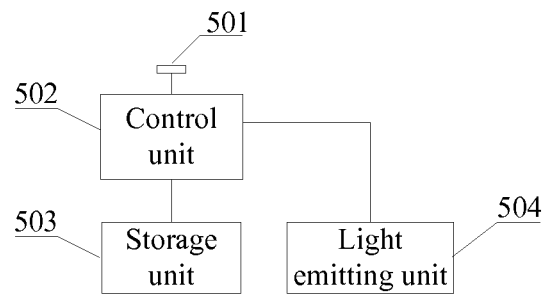
FIG. 5 is a schematic diagram of a light signal-based authorization device according to Embodiment 5 of the present invention.

Referring to FIG. 5, FIG. 5 is a schematic diagram of a light signal-based authorization device according to Embodiment 5 of the present invention. The device may be a mobile electronic device, such as a mobile phone, an MP3, an MP4, and a PSP, or is an independent device. The device includes:

at least one press-key 501, where when the number of the press-key 501 is 1, different meanings may be represented by the number of times of triggering the press-key continually in a preset time, or different meanings may be represented by different duration of triggering the press-key. When the number of the press-key 501 is more than 1, different press-keys may represent different meanings. The specific number of press-keys to be used is set as required.

When receiving trigger information from the press-key 501, a control unit 502 connected to the press-key 501 determines whether the trigger information represents writing or deletion of authorization information, and, according to a result of the determining, extracts corresponding information from a storage unit 503 connected to the control unit 502. Specifically, the control unit 502 determines that the trigger information represents writing of authorization information, and therefore, obtains writing of authorization information from the storage unit 503, converts the writing of authorization information into binary data, and uses a light emitting unit 504 connected to the control unit 502 to send the extracted information in a form of a light signal. For example, in a time period, the control unit 502 converts binary data "1" into rise-edge trigger information and converts "0" into fall-edge trigger information. The light emitting unit 504 emits light when receiving the fall-edge trigger information and emits no light when receiving the rise-edge trigger information. If determining that the trigger information represents deletion of authorization information, the control unit 502 obtains deletion of authorization information from the storage unit 503, converts the deletion of authorization information into binary data, and uses the light emitting unit 504 to send the extracted information in a flashing form.

The light emitting unit 504 may be an LED lamp, an infrared diode, or other components capable of emitting light.

The optical key (super optical key) provided in this embodiment and an ordinary optical key grant an authorization information list to the light signal receiving device in the following process:

(1) Process of writing authorization information: The super optical key sends a visible light signal representing writing of authorization information→ the light signal receiving device feeds back information, for example, an indicator of the light signal receiving device emits blue light→ an ordinary light pen sends authorization information→ the light signal receiving device writes the authorization information sent by the ordinary light pen into authorization information.

(2) Process of deleting authorization information: The super optical key sends a visible light signal representing deletion of authorization information→ the light signal receiving device feeds back information, for example, an indicator of the light signal receiving device emits red light→ an ordinary light pen sends authorization information→ the light signal receiving device deletes, from authorization information, the authorization information sent by the ordinary light pen.

In this embodiment, after a light signal receiving device is installed, a user does not need to connect a USB interface of the light signal receiving device to a host computer, but uses a super optical key to modify authorization information of the light signal receiving device, thereby facilitating authorization.

Figure 6:
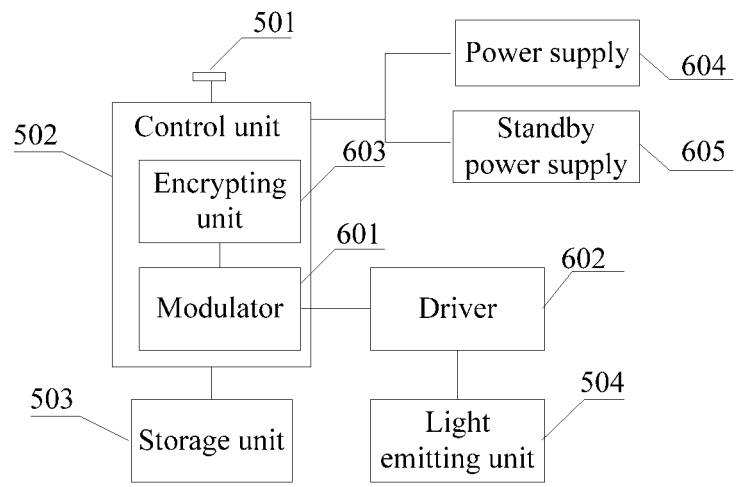
FIG. 6 is a schematic diagram of a light signal-based authorization device according to Embodiment 6 of the present invention.

Referring to FIG. 6, FIG. 6 is a schematic diagram of a light signal-based authorization device according to Embodiment 6 of the present invention. Compared with Embodiment 5, a control unit 502 of the device in this embodiment further includes a modulator 601.

A driver 602 connected between a light emitting unit 504 and a control unit 502 is configured to drive the light emitting unit 504 to send a light signal.

The control unit 502 further includes an encrypting unit 603, configured to encrypt information obtained by the control unit 502 from the storage unit 503. The encrypting unit 603 is a logical operator and/or an arithmetic operator; or the encrypting unit is an MD5 encryption operator, an RSA encryption operator, a DES encryption operator, or an AES encryption operator.

The control unit 502 is connected to a power supply 604 and a standby power supply 605, so as to provide electric energy for the control unit 502 when the power supply 604 is faulty. The standby power supply 605 may be a button battery.

In a specific implementation process, the control unit 502 may also be connected to an interface (which is not shown in the figure). The interface may provide electric energy for the control unit 502 directly or may charge the power supply 604. The interface may also be a data interface for transmitting data.

Compared with Embodiment 5, this embodiment adds an encrypting unit to improve security of a visible light signal; adds a modulator to improve stability of the visible light signal; adds a driver to ensure that a light emitting unit works in an optimal voltage or current state; and adds a standby power supply to ensure normal operation of the device.

Figure 7:
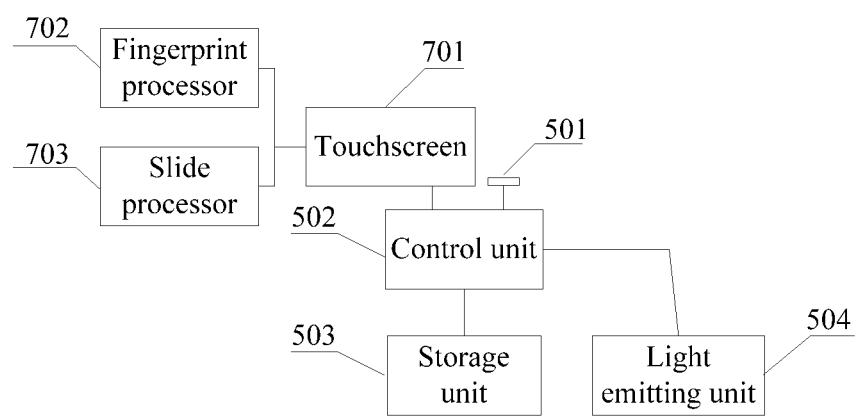
FIG. 7 is a schematic diagram of a light signal-based authorization device according to Embodiment 7 of the present invention.

Referring to FIG. 7, FIG. 7 is a schematic diagram of a light signal-based authorization device according to Embodiment 7 of the present invention. Compared with Embodiment 6, this device further includes a touchscreen 701 connected to a control unit 502. A fingerprint processor 702 connected to the touchscreen 701 is configured to receive and authenticate fingerprint information collected by the touchscreen 701, and if the authentication succeeds, use the touchscreen 701 to display an indication of performing a next action. A slide processor 703 connected to the touchscreen 701 is configured to receive and authenticate slide-to-unlock information received by the touchscreen 701, and if the authentication succeeds, use the touchscreen 701 to display an indication of performing a next action.

This embodiment adds a slide-to-unlock function to improve user experience; and adds a fingerprint verification function to improve security.

Figure 8:
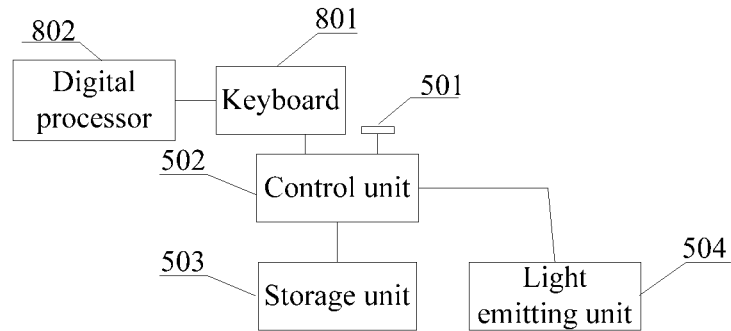
FIG. 8 is a schematic diagram of a light signal-based authorization device according to Embodiment 8 of the present invention.

Referring to FIG. 8, FIG. 8 is a schematic diagram of a light signal-based authorization device according to Embodiment 8 of the present invention. Compared with Embodiment 5, this device further includes a keyboard 801 connected to a control unit 502 and configured to input ID information of a user. A digital processor 802 connected to the keyboard 801 is configured to receive and authenticate user ID information.

In the implementation manner of the present invention, a optical key (super optical key) for modifying information in a door lock user list sends a visible light signal of deleting or writing user information to a door lock; after receiving the visible light signal, the door lock authenticates the received visible light signal, and makes a response if the authentication succeeds; and the door lock receives information sent by a optical key (ordinary optical key) corresponding to the user information, and then deletes the user information from user list information, or writes the user information into user list information. In this way, the information in a door lock user list is modified by using the super optical key, and the information in a door lock user list of the door lock is managed.

Figure 9:
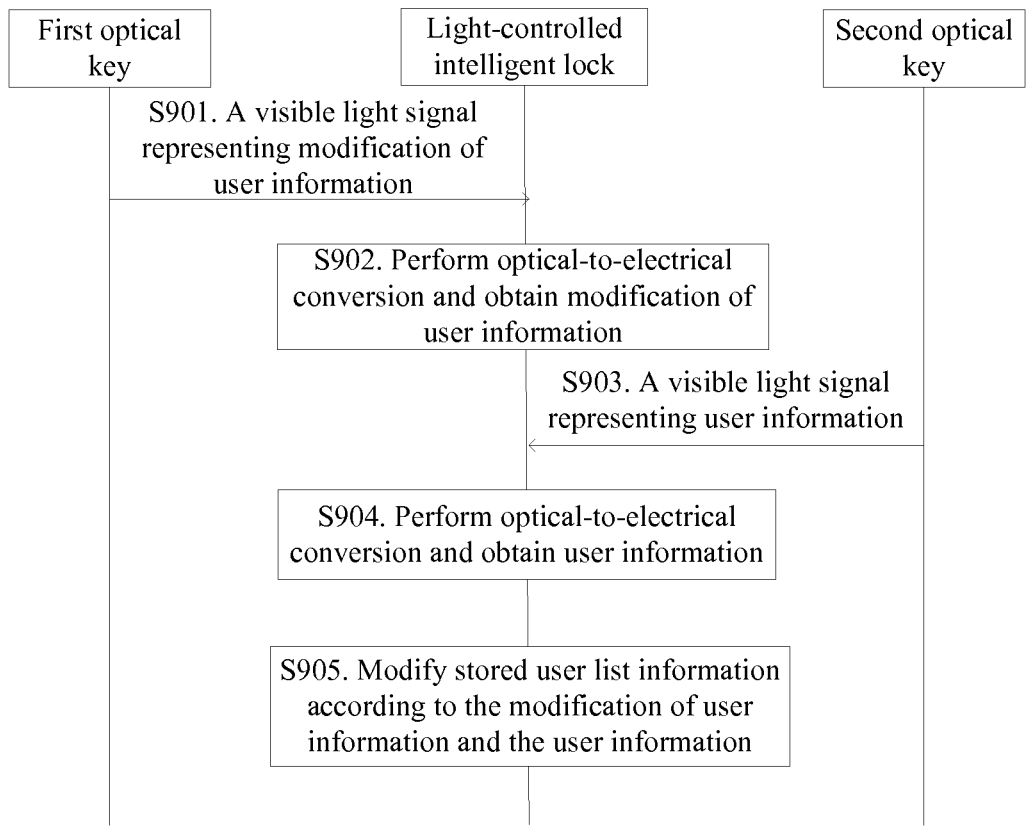
FIG. 9 is a flowchart of a method for modifying information in a door lock user list according to Embodiment 1 of the present invention.

Referring to FIG. 9, FIG. 9 is a flowchart of a method for modifying information in a door lock user list according to Embodiment 1 of the present invention.

S901. A first optical key sends a visible light signal representing modification of user information.

S902. A light-controlled intelligent lock receives the visible light signal sent by the first optical key, converts the received visible light signal into an electrical signal, then converts the electrical signal into a first digital signal, and obtains modification of user information.

S903. A second optical key sends a visible light signal representing user information to a door lock.

S904. The light-controlled intelligent lock converts the received visible light signal sent by the second optical key into a second digital signal, and obtains user information.

S905. The light-controlled intelligent lock modifies stored user list information according to the modification of user information and the user information.

In this embodiment, user information list is modified in a contactless manner, which avoids that user list information cannot be modified after a door lock is installed on a door.

Figure 10:
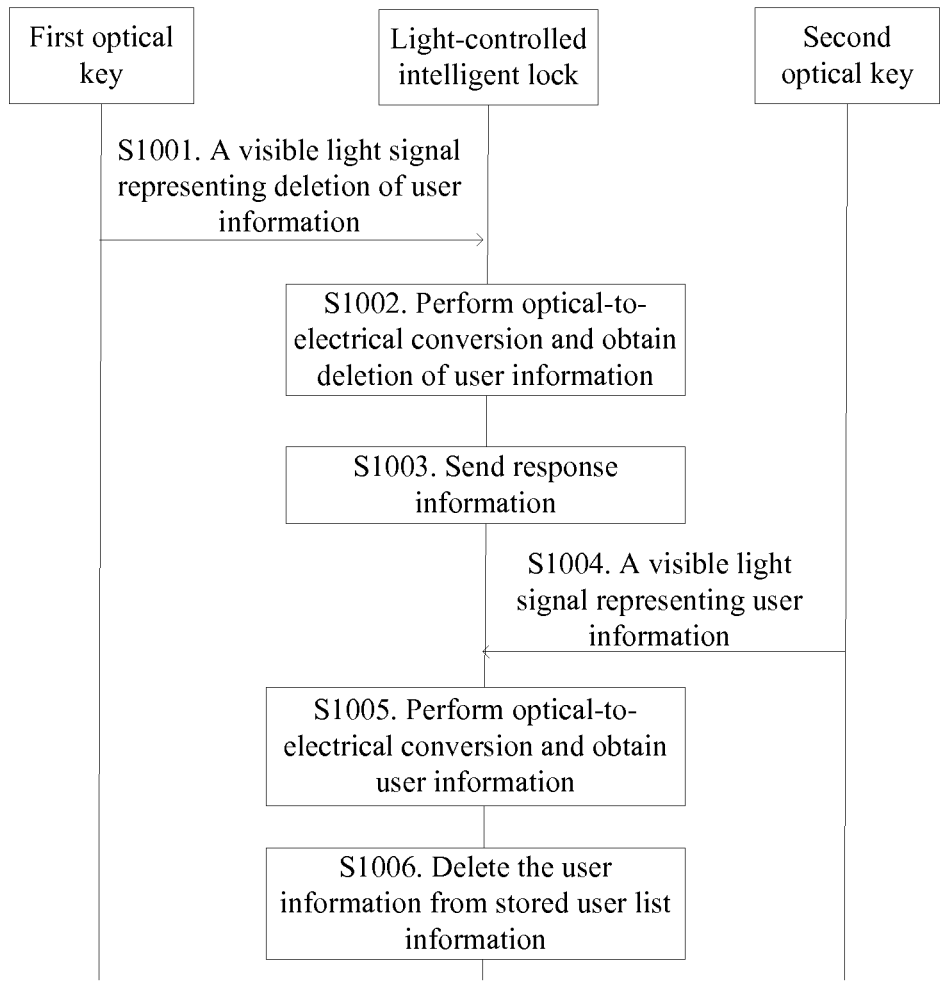
FIG. 10 is a flowchart of a method for modifying information in a door lock user list according to Embodiment 2 of the present invention.

Referring to FIG. 10, FIG. 10 is a flowchart of a method for modifying information in a door lock user list according to Embodiment 2 of the present invention.

S1001. A first optical key sends a visible light signal representing deletion of user information.

S1002. A light-controlled intelligent lock receives the visible light signal sent by the first optical key, and a door lock converts the received visible light signal into an electrical signal, then converts the electrical signal into a first digital signal, and obtains deletion of user information.

S1003. The light-controlled intelligent lock sends response information.

Specifically, the response information may be sound information, for example, sound information such as "Please go on" or "ok"; or may be indicator information, for example, blue light or red light emitted by an indicator.

S1004. A second optical key sends a visible light signal representing user information to the door lock.

S1005. The light-controlled intelligent lock receives the visible light signal sent by the second optical key, converts the visible light signal into a second digital signal, and obtains user information.

S1006. The light-controlled intelligent lock deletes, from stored user list information, the user information sent by the second optical key.

This embodiment describes a method for deleting information in a door lock user list in a contactless manner. This embodiment avoids that user information cannot be deleted from a door lock user list after the door lock is installed on a door.

Figure 11:
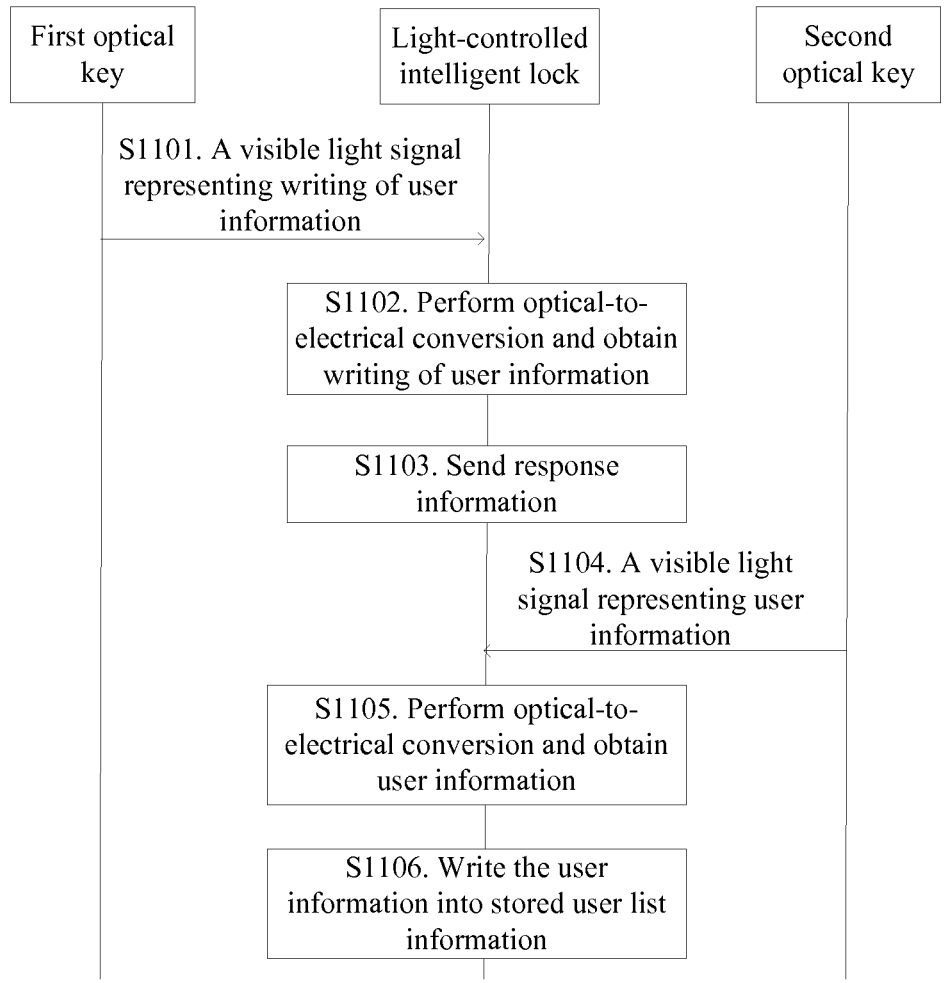
FIG. 11 is a flowchart of a method for modifying information in a door lock user list according to Embodiment 3 of the present invention.

Referring to FIG. 11, FIG. 11 is a flowchart of a method for modifying information in a door lock user list according to Embodiment 3 of the present invention.

S1101. A first optical key sends a visible light signal representing writing of user information.

S1102. A light-controlled intelligent lock receives the visible light signal sent by the first optical key, and the door lock converts the received visible light signal into an electrical signal, then converts the electrical signal into a first digital signal, and obtains writing of user information.

S1103. The light-controlled intelligent lock sends response information.

Specifically, the response information may be sound information, for example, sound information such as "Please go on" or "ok"; or may be indicator information, for example, blue light or red light emitted by an indicator.

S1104. A second optical key sends a visible light signal representing user information to the door lock.

S1105. The light-controlled intelligent lock receives the visible light signal sent by the second optical key, converts the visible light signal into a second digital signal, and obtains user information.

S1106. The light-controlled intelligent lock writes the user information sent by the second optical key into stored user list information.

This embodiment describes a method for writing information in a door lock user list in a contactless manner. In this embodiment, it can be avoided that user information cannot be written after the door lock is installed on a door.

Figure 12:
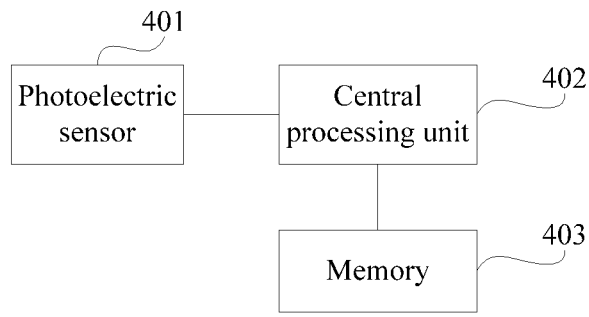
FIG. 12 is a schematic structural diagram of a light-controlled intelligent lock according to Embodiment 4 of the present invention.

Referring to FIG. 12, FIG. 12 is a schematic structural diagram of a light-controlled intelligent lock according to Embodiment 4 of the present invention. The light-controlled intelligent lock includes a photoelectric sensor 401 that receives the visible light signal and converts the received visible light signal into a digital signal. In a specific implementation process, what is received by the photoelectric sensor 401 may be the visible light signal that is sent by the first optical key and represents writing or deletion of user information, or may be the visible light signal that is sent by the second optical key and represents user information.

When receiving a first digital signal representing modification of user information from the photoelectric sensor 401 and a second digital signal representing user information from the photoelectric sensor 401 consecutively, a central processing unit 402 connected to the photoelectric sensor 401 controls a memory 403 connected to the central processing unit 402 to modify user list information according to the user information.

Specifically, after receiving writing of user information from the photoelectric sensor 401, the central processing unit 402 further receives user information from the photoelectric sensor 401, and controls the memory 403 to write the user information into stored user list information; or, after receiving deletion of user information from the photoelectric sensor 401, the central processing unit 402 further receives user information from the photoelectric sensor 401, and controls the memory 403 to delete the user information from stored user list information.

The light-controlled intelligent lock provided in this embodiment can receive a visible light signal, and deletes stored list information according to the visible light signal, which avoids that user list information cannot be deleted after a door lock is installed on a door.

Figure 13:
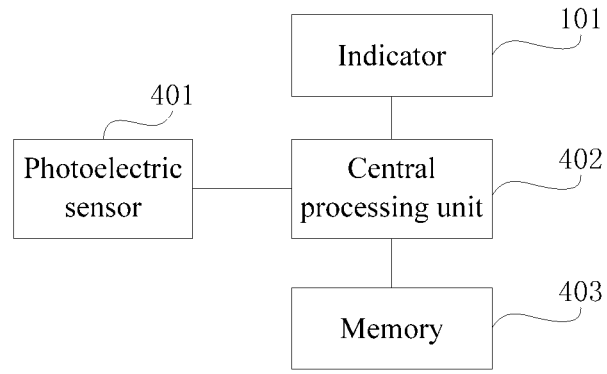
FIG. 13 is a schematic structural diagram of a light-controlled intelligent lock according to Embodiment 5 of the present invention.

Referring to FIG. 13, FIG. 13 is a schematic structural diagram of a light-controlled intelligent lock according to Embodiment 5 of the present invention. Compared with Embodiment 4, an indicator 101 connected to a central processing unit 402 is included, where the indicator 101 may be an LED lamp and is configured to send an indication signal when receiving an indication instruction sent by the central processing unit. For example, when receiving a first digital signal representing writing of user information, the central processing unit 402 sends, to the indicator 101, an instruction of emitting blue light; and, when receiving a first digital signal representing deletion of user information, the central processing unit 402 sends, to the indicator 101, an instruction of emitting red light.

In this embodiment, when receiving modification of user information that is sent by a super optical key, a light-controlled intelligent lock feeds back information by using a signal lamp. As indicated by the signal lamp, a user may continue sending user information by using an ordinary optical key.

Figure 14:
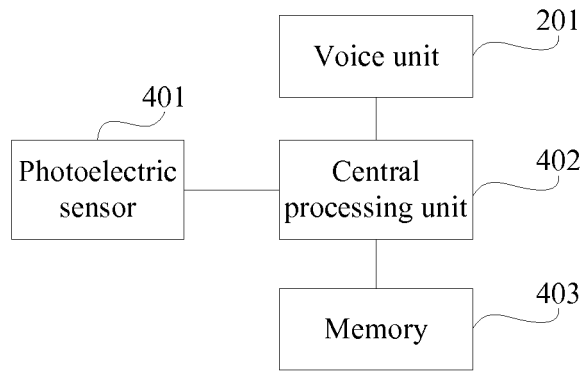
FIG. 14 is a schematic structural diagram of a light-controlled intelligent lock according to Embodiment 6 of the present invention.

Referring to FIG. 14, FIG. 14 is a schematic structural diagram of a light-controlled intelligent lock according to Embodiment 6 of the present invention. Compared with Embodiment 4, the light-controlled intelligent lock in this embodiment further includes a voice unit 201 connected to the central processing unit 402 and configured to emit a prompt tone when receiving a voice prompt instruction sent by the central processing unit 402. For example, when receiving a first digital signal representing writing of user information, the central processing unit 402 sends a "Please write" voice prompt instruction to the voice unit 201, and the voice unit 201 emits a sound of "Please write"; and, when receiving a first digital signal representing deletion of user information, the central processing unit 402 sends a "Please delete" voice prompt instruction, and the voice unit 201 emits a sound of "Please delete".

In this embodiment, when receiving modification of user information that is sent by a super optical key, a light-controlled intelligent lock feeds back information by using a sound prompt. According to the voice prompt, a user may continue sending user information by using an ordinary optical key.

In the implementation manner of the present invention, a fingerprint optical key (super optical key) for modifying information in a door lock user list sends, to a door lock, a visible light signal of deleting or writing user information; after receiving the visible light signal, the door lock authenticates the received visible light signal, and makes a response if the authentication succeeds; and the door lock receives information sent by a optical key (ordinary optical key) corresponding to the user information, and then deletes the user information from user list information, or writes the user information into user list information. In this way, the information in a door lock user list is modified by using the super optical key, and the information in a door lock user list of the door lock is managed.

Figure 15:
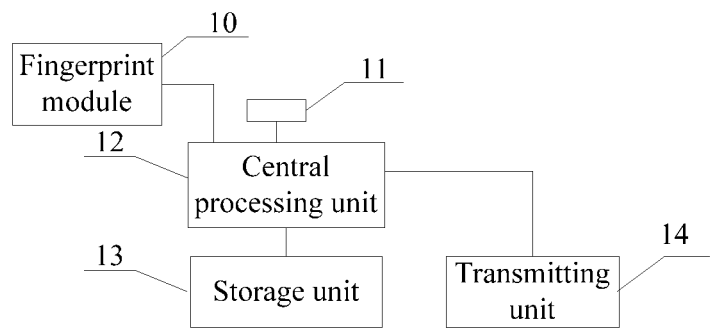
FIG. 15 is a schematic structural diagram of a fingerprint optical key for modifying information in a door lock user list according to Embodiment 1 of the present invention.

Referring to FIG. 15, FIG. 15 is a schematic structural diagram of a fingerprint optical key for modifying information in a door lock user list according to Embodiment 1 of the present invention. The fingerprint optical key includes a fingerprint module 10 and at least one press-key 11, and a central processing unit 12 that is separately connected to the fingerprint module 10 and at least one press-key 11.

The fingerprint module 10 is configured to collect fingerprint information of a user, and send the collected fingerprint information of the user to the central processing unit 12 connected to the fingerprint module. The central processing unit 12 obtains a fingerprint information list from a storage unit 13 connected to the central processing unit, and compares the fingerprint information list with the received fingerprint information to verify whether the received fingerprint information is legal; and, if the received fingerprint information is legal, prompts the user to perform a next action.

When there is one press-key 11, different meanings are represented by the number of times of continual triggering, or are represented by "pressing and holding" or "pressing"; when there are more than one press-key 11, different meanings may be represented by different press-keys. The specific number of press-keys to be used is set as required.

When receiving trigger information from the press-key 11, the central processing unit 12 determines whether the trigger information represents writing or deletion of user information, and, according to a result of the determining, extracts corresponding information from a storage unit 13 connected to the central processing unit 12. Specifically, the central processing unit 12 determines that the trigger information represents writing of user information, and therefore, obtains writing of user information from the storage unit 13, converts the writing of user information into binary data, and uses a light emitting unit 14 connected to the central processing unit 12 to send the extracted information in a flashing form. For example, in a time period, the central processing unit 12 converts binary data "1" into a rise-edge trigger signal and converts "0" into a fall-edge trigger signal. The light emitting unit 14 emits light when receiving the fall-edge trigger signal and emits no light when receiving the rise-edge trigger signal. If determining that the trigger information represents deletion of user information, the central processing unit 12 obtains deletion of user information from the storage unit 13, converts the deletion of user information into binary data, and uses the light emitting unit 14 to send the extracted information in a flashing form.

The light emitting unit 14 may be an LED lamp or other components capable of emitting light.

The fingerprint optical key (super optical key) provided in this embodiment and an ordinary optical key modify information in a door lock user list in the following process:

(1) Process of writing user information: The super optical key sends a visible light signal representing writing of user information→ the door lock feeds back information, for example, an indicator of the door lock emits blue light→ an ordinary light pen sends user information→ the door lock writes, into user list information, the user information sent by the ordinary light pen.

(2) Process of deleting user information: The super optical key sends a visible light signal representing deletion of user information→ the door lock feeds back information, for example, an indicator of the door lock emits red light→ an ordinary light pen sends user information→ the door lock deletes, from the user list information, the user information sent by the ordinary light pen.

In this embodiment, after a door lock is installed, a user does not need to connect a USB interface of the door lock to a host computer, but uses a super fingerprint optical key to modify information in a door lock user list, thereby facilitating authorization. In addition, an illegal user is prevented from using the fingerprint optical key to modify the information in a door lock user list.

Figure 16:
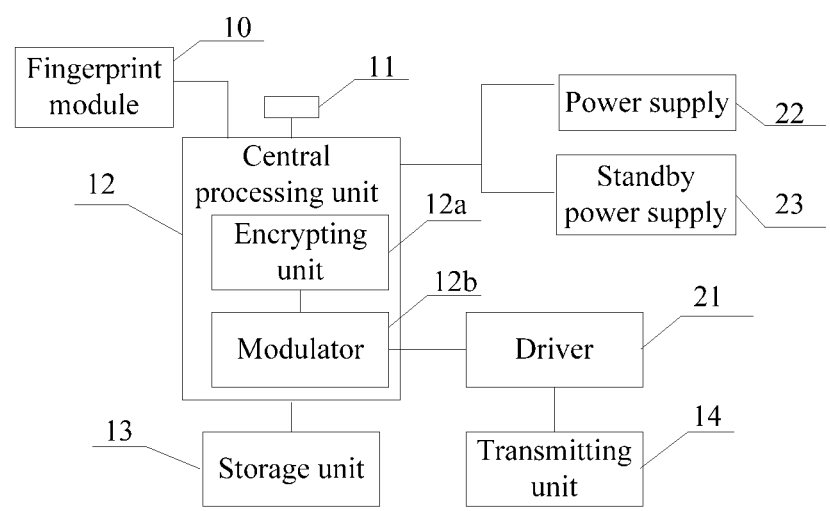
FIG. 16 is a schematic structural diagram of a fingerprint optical key for modifying information in a door lock user list according to Embodiment 2 of the present invention.

Referring to FIG. 16, FIG. 16 is a schematic structural diagram of a fingerprint optical key for modifying information in a door lock user list according to Embodiment 2 of the present invention. The fingerprint optical key includes a fingerprint module 10 and a press-key 11, and a central processing unit 12 that is connected to both the fingerprint module 10 and the press-key 11.

The fingerprint module 10 is configured to collect fingerprint information of a user, and send the collected fingerprint information of the user to the central processing unit 12 connected to the fingerprint module. The central processing unit 12 obtains a fingerprint information list from a storage unit 13 connected to the central processing unit, and compares the fingerprint information list with the received fingerprint information to verify whether the received fingerprint information is legal; and if the received fingerprint information is legal, prompts the user to perform a next action.

Different meanings are represented by the number of times of continually triggering the press-key 11. For example, pressing once represents writing of user information, and pressing twice continually represents deletion of user information.

When receiving trigger information from the press-key 11, the central processing unit 12 determines whether the trigger information represents writing or deletion of user information, and, according to a result of the determining, extracts corresponding information from a storage unit 13 connected to the central processing unit 12. The central processing unit 12 converts the extracted information into binary data. Based on a Manchester coding manner, it is ensured that an electric level is converted once in the exact middle of each code element, which is good for a receive end to extract a bit synchronization signal. Therefore, in this embodiment, the binary data is converted into a rise-edge or fall-edge trigger signal in a Manchester coding manner. An encrypting unit 12a of the central processing unit 12 encrypts the rise-edge or fall-edge trigger signal by using an encryption algorithm. A modulator 12b connected to the encrypting unit 12 modulates the encrypted rise-edge or fall-edge trigger signal, and a driver 21 connected to the modulator 12b of the central processing unit 12 drives a light emitting unit 14 to send the modulated rise-edge or fall-edge trigger signal in a flashing form. For example, in a time period, the central processing unit 12 converts binary data "1" into a rise-edge trigger signal and converts "0" into a fall-edge trigger signal. The light emitting unit 14 emits light when receiving the fall-edge trigger signal and emits no light when receiving the rise-edge trigger signal.

A power supply 22 connected to the central processing unit 12 is configured to provide electric energy for the central processing unit 12. The central processing unit 12 may also be connected to a standby power supply 23, so as to provide electric energy for the central processing unit 12 when the power supply 22 is faulty. The standby power supply 23 may be a button battery.

In a specific implementation process, the central processing unit 12 may also be connected to a USB interface (which is not shown in the figure). The USB interface may provide electric energy for the central processing unit 12 directly or may charge the power supply 22.

Compared with Embodiment 1, the central processing unit 12 in this embodiment adds an encryption function, and therefore, can improve security of a visible light signal; the central processing unit 12 adds a modulator 12b to improve stability of the visible light signal; adds a driver 21 connected to the central processing unit 12 to ensure that a light emitting unit 14 works in an optimal voltage or current state.

What is disclosed above is merely an exemplary implementation manner of the present invention, and is not intended to limit the protection scope of the present invention. Therefore, equivalent variations made according to the claims of the present invention shall still fall within the scope of the present invention.

What is claimed is:

1. A light signal-based information processing method, wherein the method comprises:
   a light signal transmitting device receiving trigger information that represents deleting or writing of authorization information; extracting corresponding information according to the trigger information; and sending the extracted information in a form of a visible light signal,
   a light signal receiving device receiving the visible light signal, obtaining modification of user information and user information according to the visible light signal, and modifying stored user list information according to the modification of user information and the user information;
   wherein receiving the visible light signal, obtaining modification of user information and user information according to the visible light signal comprises:
   receiving the visible light signal sent by a first optical key, converts the visible light signal into an electrical signal, then converts the electrical signal into a first digital signal, and obtains the modification of user information; and
   receiving the visible light signal sent by a second optical key, converts the visible light signal into an electrical signal, then converts the electrical signal into a second digital signal, and obtains the user information;
   wherein the light signal transmitting device sending the extracted information in a form of a visible light signal comprises:
   a first optical key sends a visible light signal representing writing or deletion of authorization information to light signal receiving device, the light signal receiving device feeds back information, a second optical key sends authorization information, the light signal receiving device writes or delete the authorization information sent by the second optical key into authorization information.

2. The method according to claim 1, wherein the method is a light signal-based authorization method, wherein
   the receiving trigger information comprises: receiving trigger information that represents deletion or writing of authorization information;
   the extracting corresponding information according to the trigger information comprises: obtaining the corresponding information locally according to the trigger information; and
   the sending the extracted information in a form of a visible light signal comprises: controlling a light emitting unit to send the information in a form of a light signal.

3. The method according to claim 2, wherein the obtaining the corresponding information according to the trigger information comprises:
   obtaining, according to the trigger information, an instruction of writing authorization information or an instruction of deleting authorization information.

4. The method according to claim 2, wherein the receiving trigger information that represents deletion or writing of authorization information specifically comprises:
   receiving, by using a press-key, the trigger information that represents deletion or writing of authorization information;
   wherein, using a changing pseudocode signal to encrypt the information, the changing pseudocode sequence is a pseudocode sequence that changes continuously with local time, or a pseudocode sequence that changes with a preset unit time, or a pseudocode sequence that changes with the preset number of signal transmission times, or a pseudocode sequence in which a signal frequency changes with a preset condition.

5. The method according to claim 4, wherein the receiving, by using a press-key, the trigger information that represents deletion or writing of authorization information, specifically comprises:
   receiving, according to different number of times of triggering a same press-key continually in a preset time, the trigger information that represents deletion or writing of the authorization information; or
   receiving, according to different duration of triggering a same press-key, the trigger information that represents deletion or writing of the authorization information; or,
   receiving, by using different press-keys, the trigger information that represents deletion or writing of the authorization information.

6. The method according to claim 2, before the method, further comprises:
   collecting biometric information of a user, and if the biometric information matches a prestored verification condition, determining that the authorization information is legal; or,
   receiving, by using a keyboard, ID information and/or password information input by a user, and if the ID information and/or password information matches pre-stored information, determining that the authorization information is legal; or, receiving, by using a touchscreen, ID information and/or password information input by a user, and if the ID information and/or password information matches pre-stored information, determining that the authorization information is legal.

7. The method according to claim 2, after the obtaining the corresponding information according to the trigger information, further comprising:

using a changing pseudocode sequence and the variation authorization information to perform a logical operation and/or an arithmetic operation, and encrypting the information.

8. The method according to claim 7, wherein the changing pseudocode sequence is a pseudocode sequence that changes continuously with local time; or a pseudocode sequence that changes with a preset unit time; or the changing pseudocode sequence is a pseudocode sequence that changes continually with the preset number of signal transmission times; or the changing pseudocode sequence is a pseudocode sequence in which a signal frequency changes with crystal oscillator information; or, a pseudocode sequence in which a signal frequency changes with local clock information.

9. The method according to claim 2, before the controlling a light emitting unit to send the information in a form of a light signal, further comprising:

encoding the information.

10. The method according to claim 1, wherein the method is a method for modifying information in a door lock user list, wherein the receiving a visible light signal and obtaining modification of user information and user information according to the visible light signal comprises: receiving a visible light signal sent by a first optical key, converting the visible light signal into a first digital signal, and obtaining the modification of user information; and receiving a visible light signal sent by a second optical key, converting the visible light signal into a second digital signal, and obtaining the user information; and the modifying stored user list information according to the modification of user information and the user information comprises: modifying stored user list information according to the modification of user information and the user information.

11. The method according to claim 10, before the receiving a visible light signal sent by a second optical key, further comprising:

sending response information.

12. A light signal-based information processing device, comprising: a control unit, configured to a light signal transmitting device receives trigger information that represents deleting or writing of authorization information, extracts corresponding information according to the trigger information, and sends the extracted information in a form of a visible light signal;

a light signal receiving device receives the visible light signal, obtain modification of user information and user information according to the visible light signal, and modify stored user list information according to the modification of user information and the user information;

wherein receives the visible light signal, obtains modification of user information and user information according to the visible light signal comprises:

receiving the visible light signal sent by a first optical key, converts the visible light signal into an electrical signal, then converts the electrical signal into a first digital signal, and obtains the modification of user information; and receiving the visible light signal sent by a second optical key, converts the visible light signal into an electrical signal, then converts the electrical signal into a second digital signal, and obtains the user information;

wherein the light signal transmitting device sends the extracted information in a form of a visible light signal comprises:

a first optical key sends a visible light signal representing writing or deletion of authorization information to a light signal receiving device, the light signal receiving device feeds back information, a second optical key sends authorization information, the light signal receiving device writes or deletes the authorization information sent by the second optical key into authorization information.

13. The device according to claim 12, wherein the device is a light signal-based authorization device, and the device further comprises a storage unit and a light emitting unit, and the control unit is configured to receive trigger information that represents deletion or writing of authorization information, obtain corresponding information from the storage unit, and control a light emitting unit to send the information in a form of a light signal.

14. The device according to claim 13, wherein the control unit further comprises a modulator, configured to modulate the information; and/or an interface connected to the control unit.

15. The device according to claim 13, wherein the device further comprises at least one press-key connected to the controller;

wherein, using a changing pseudocode signal to encrypt the information, the changing pseudocode sequence is a pseudocode sequence that changes continuously with local time, or a pseudocode sequence that changes with a preset unit time, or a pseudocode sequence that changes with the preset number of signal transmission times, or a pseudocode sequence in which a signal frequency changes with a preset condition.

16. The device according to claim 13, wherein the device further comprises a touchscreen connected to the control unit.

17. The device according to claim 16, wherein the device further comprises a fingerprint processor connected to the touchscreen and configured to receive and authenticate fingerprint information collected by the touchscreen; and/or, the device further comprises a slide processor configured to receive and authenticate unlocked information received by the touchscreen.

18. The device according to claim 13, wherein the device further comprises a keyboard connected to the control unit and configured to input user ID information; and a digital processor connected to the keyboard and configured to receive and authenticate the user ID information.

19. The device according to claim 13, wherein the control unit further comprises an encrypting unit, configured to encrypt information obtained from the storage unit; and wherein, the encrypting unit is a logical operator and/or an arithmetic operator.

20. The device according to claim 12, wherein the device is a light-controlled intelligent lock, the light-controlled intelligent lock comprises a photoelectric sensor configured to receive a visible light signal and convert the received visible light signal into a digital signal; a central processing unit connected to the photoelectric sensor and configured to: when receiving a first digital signal representing modification of user information and a second digital signal representing user information from the photoelectric sensor consecutively, control a memory connected to the central processing unit to modify user list information according to the user information, wherein the control unit is the central processing unit; or the device is a fingerprint optical key for modifying user list information, wherein the fingerprint optical key comprises a fingerprint module configured to collect user fingerprint information and at least one press-key; a central processing unit connected to the fingerprint module and the press-key authenticates fingerprint information when receiving the fingerprint information sent by the fingerprint module; if the authentication succeeds, when receiving trigger information from the press-key, determines whether the trigger information represents writing or deletion of user list information; according to a result of the determining, extracts corresponding information from a storage unit connected to the central processing unit; and uses a light emitting unit connected to the central processing unit to send the extracted information in a form of a visible light signal, wherein the control unit is the central processing unit.

* * * * *